United States Patent
Kunieda et al.

[11] Patent Number: 6,075,536
[45] Date of Patent: Jun. 13, 2000

[54] INFORMATION VISUALIZING SYSTEM

[75] Inventors: Kazuo Kunieda; Masaki Hara, both of Tokyo, Japan

[73] Assignee: NEC Corporation, Tokyo, Japan

[21] Appl. No.: 09/138,574

[22] Filed: Aug. 24, 1998

[30] Foreign Application Priority Data

Aug. 22, 1997 [JP] Japan ................................. 9-226133

[51] Int. Cl.[7] ................................. G06F 3/00; G06T 17/00
[52] U.S. Cl. ........................ 345/355; 345/419; 345/339
[58] Field of Search ................................ 345/355, 339, 345/419

[56] References Cited

U.S. PATENT DOCUMENTS 5,737,533  4/1998  De Hond ............................... 709/219
5,861,885  1/1999  Strasnick et al. ...................... 345/355

*Primary Examiner*—Raymond J. Bayerl
*Assistant Examiner*—Sy D. Luu
*Attorney, Agent, or Firm*—Young & Thompson

[57] ABSTRACT

To provide an information visualizing system for presenting information of items to a user flexibly and automatically according to user's manipulation to control a virtual space, the information visualizing includes a target object indicator (22) for designating certain of visual object displayed in the virtual space as target objects whereof positional relation to a target indication object displayed in the virtual space satisfies a certain condition; a related-information generator (23 and 24) for generating related-information to be displayed in connection to the target objects according to relational condition designated by the user by processing information concerning the target objects; a target object revisor (26) for controlling the target object indicator to update the target objects automatically at appropriate intervals according to the situation of the virtual space; and a related-information (27) revisor for controlling the related-information generator (23 and 24) to update the related-information automatically at appropriate intervals according to the situation of the virtual space.

6 Claims, 13 Drawing Sheets

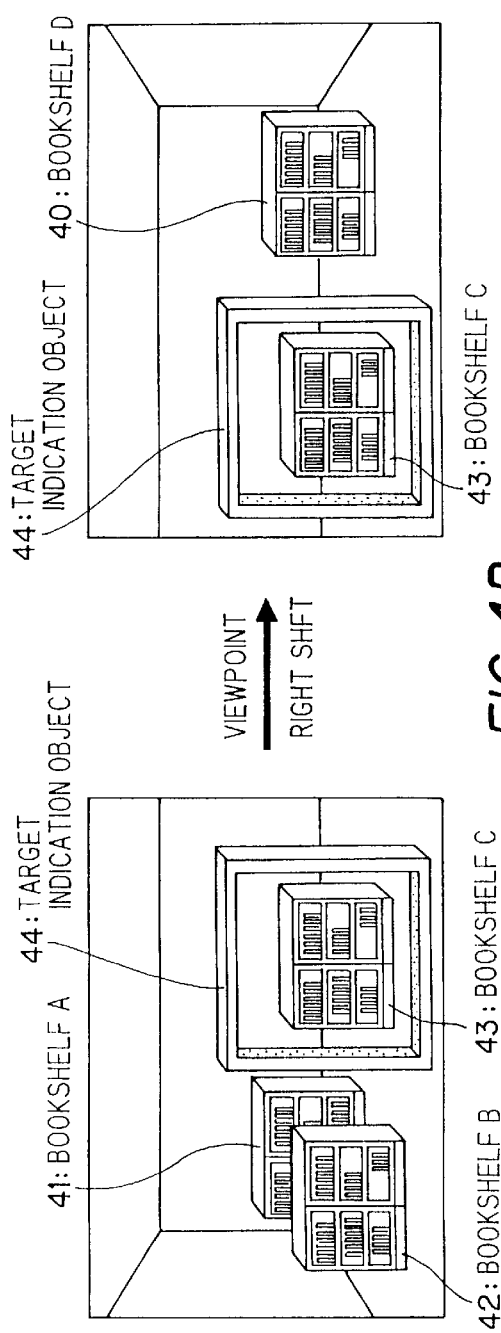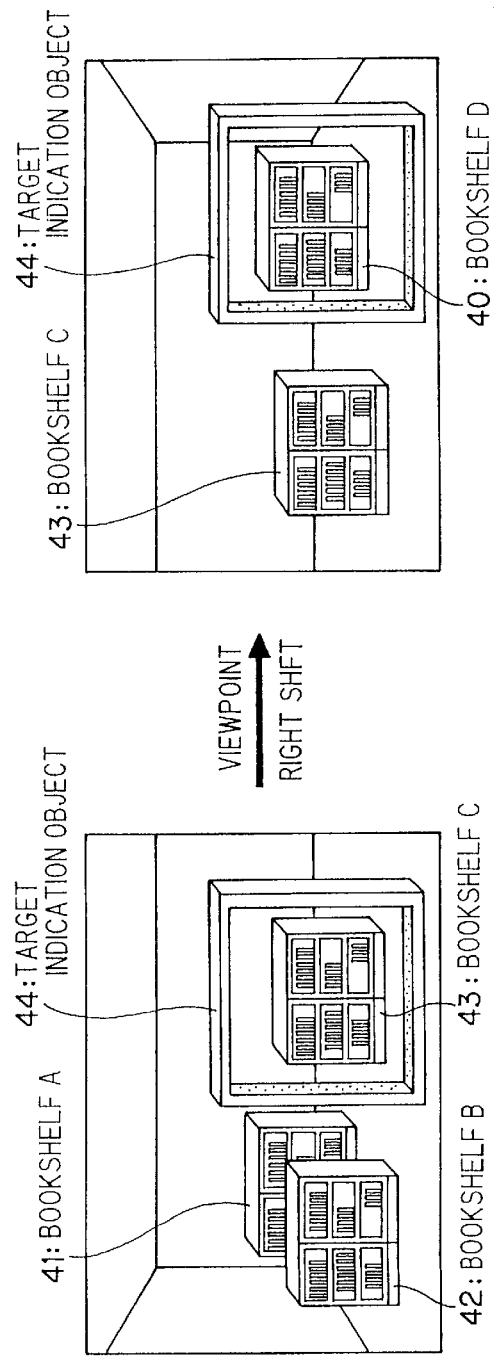

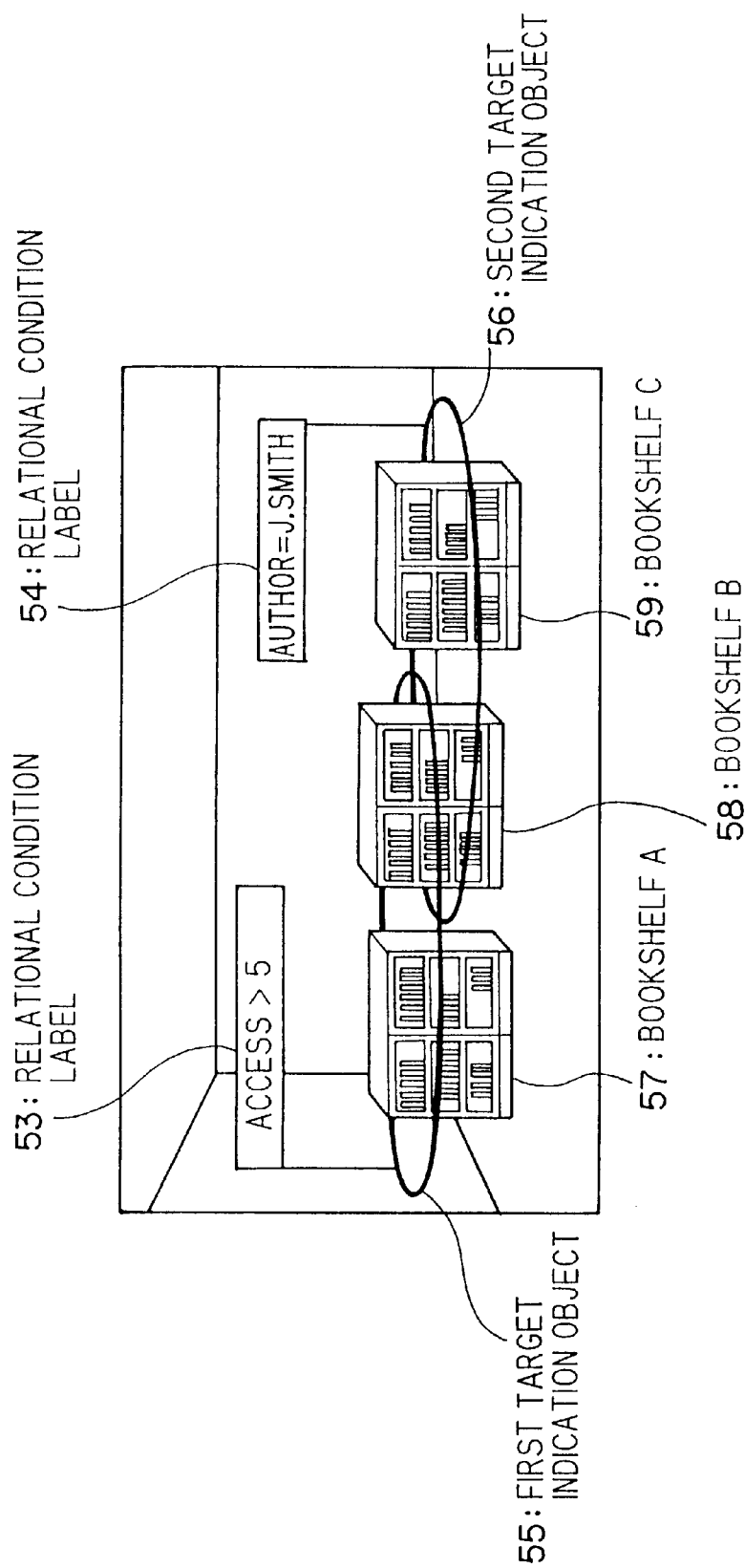

FIG.9

70: INFORMATION LIST

| INFORMATION | ATTRIBUTE |
|---|---|
| BOOK INFORMATION | {BOOK ID, TITLE, AUTHOR, PUBLISHED YEAR, PUBLISHER, GENRE ...} |
| BOOK MANAGEMENT INFORMATION | {BOOK ID, OBJECT ID, BOOKSHELF ID, COORDINATES, ...} |
| BOOKSHELF MANAGEMENT INFORMATION | {BOOKSHELF ID, COORDINATES, ...} |
| VIRTUAL SPACE SITUATION INFORMATION | COORDINATES OF VIEWPOINT, EYE DIRECTION, POINTING INFORMATION,... |
| TARGET INDICATION OBJECT MANAGEMENT INFORMATION | {TARGET INDICATION OBJECT ID, RELATIONAL CONDITION, POSITIONAL CONDITION, COORDINATES,...} |
| USER MANAGEMENT INFORMATION | {USER ID, ACCESS HISTORY,...} |

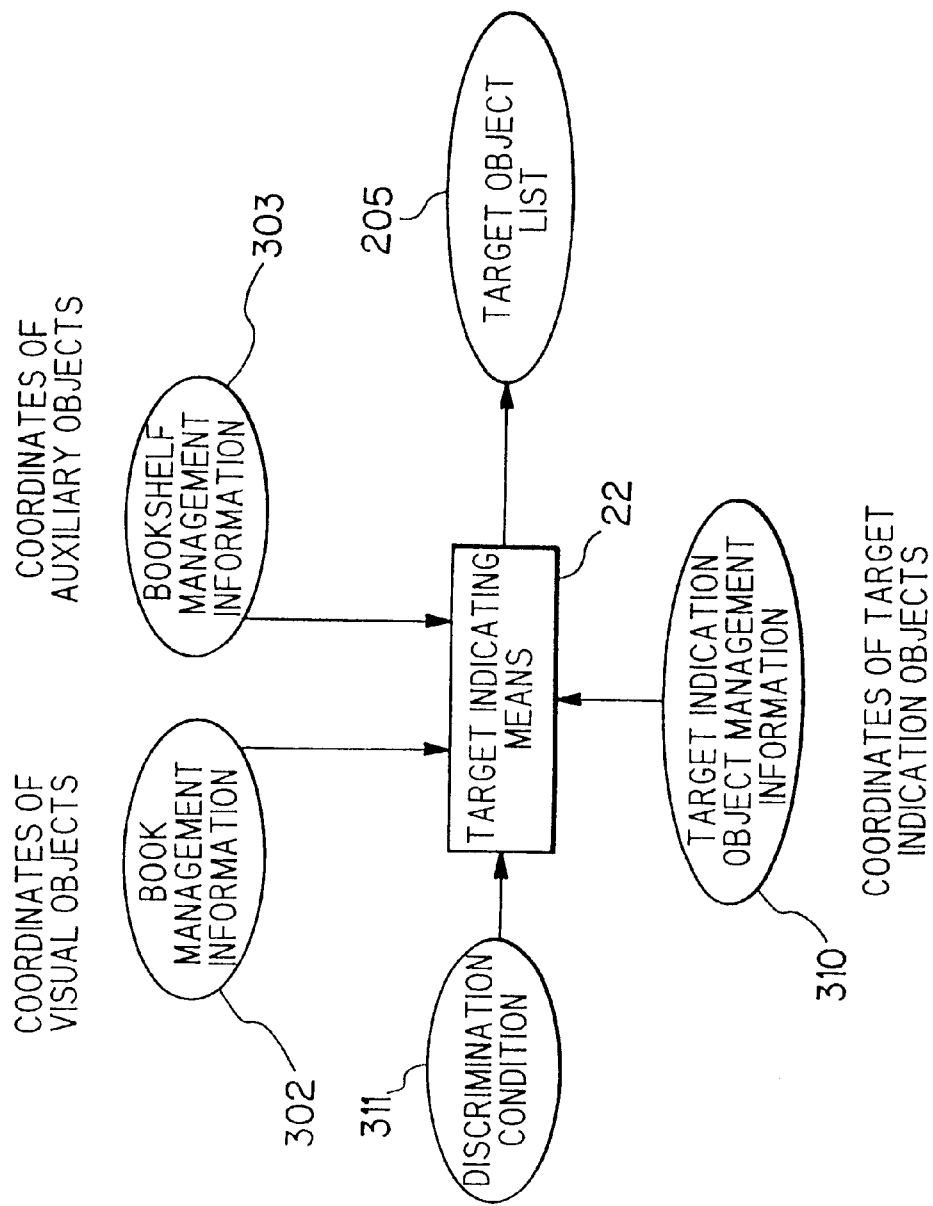

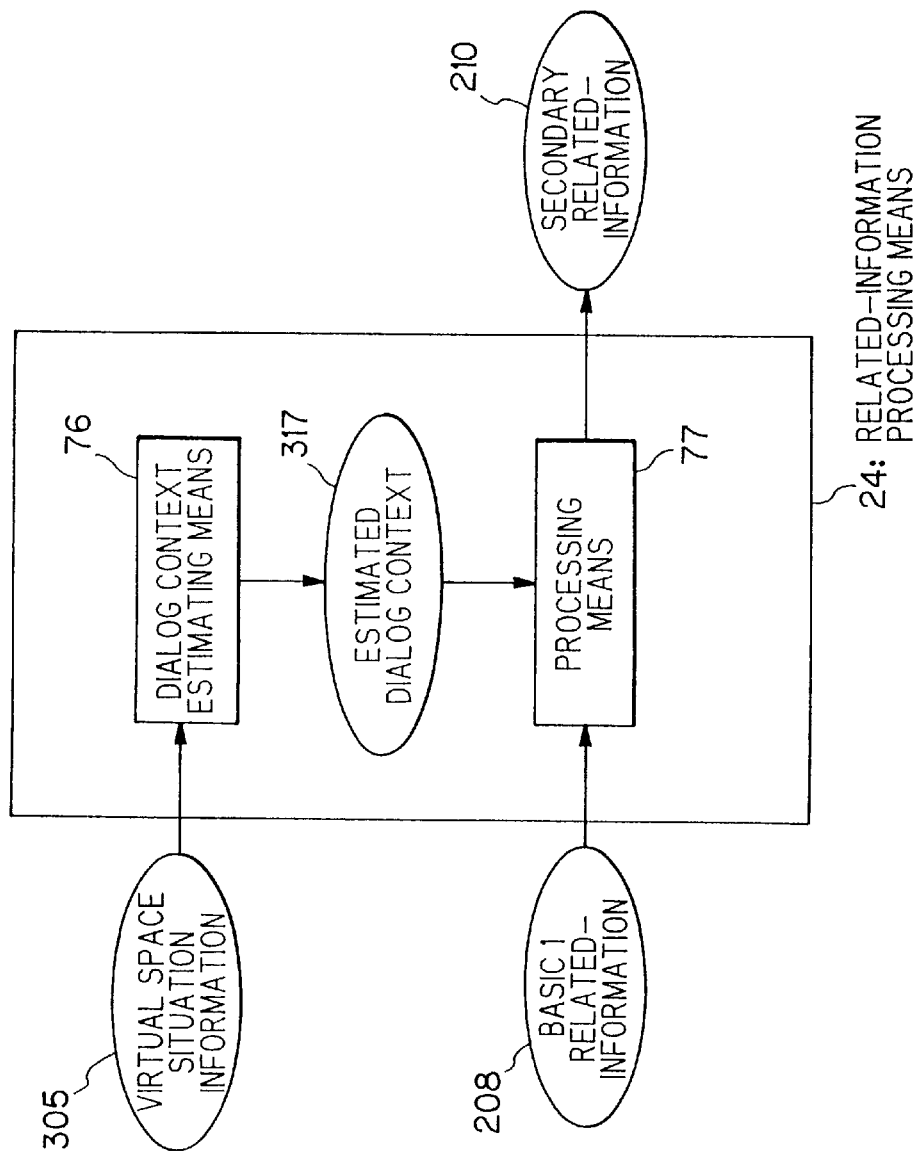

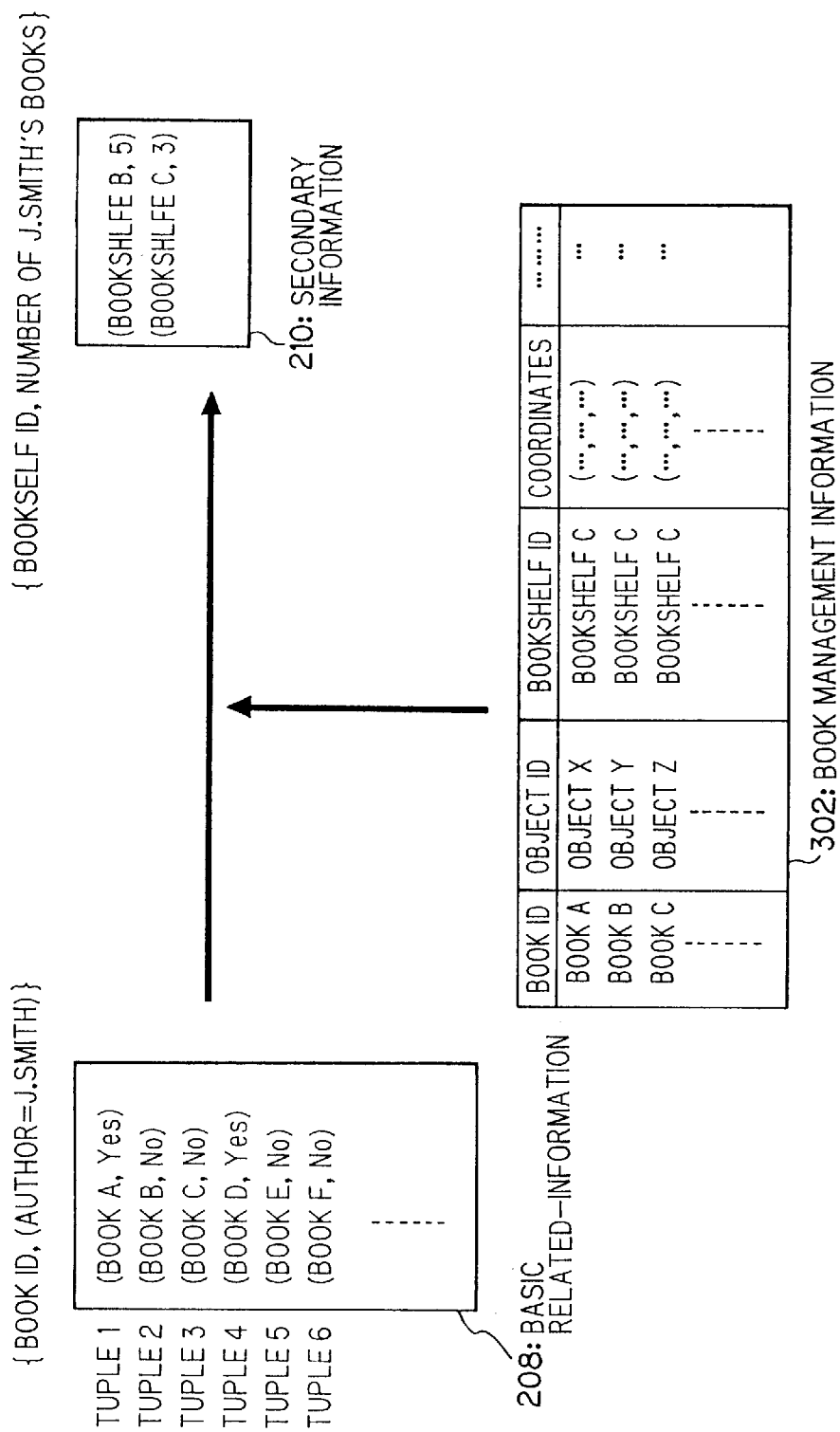

INFORMATION VISUALIZING SYSTEM

BACKGROUND OF THE INVENTION

The present invention relates to all information visualizing system for presenting information about items to a user by appropriately arranging visualizations of the items in a spatial image which is virtually generated by a computer.

Recently, many techniques have been proposed concerning information visualizing systems, which provide frames for presenting information about items to a user by appropriately arranging visualizations of the items in a virtual space generated by a computer. An example of the information visualizing system is disclosed in a Japanese patent application laid open as a Provisional Publication No. 63324/'98, entitled "A Data Management System and an Icon Display Apparatus."

In this prior art, files of a database are visualized with three-dimensional icons of buildings each having a form and a size determined according to type and size of a file to be represented. In cities of a virtual land generated by a computer, each of the buildings is arranged in a section of a town according to attributes of the file.

A user walks around in the town by changing his viewpoint or magnifying/demagnifying the virtual space making use of an input device of the computer. When a target building is found, the user specifies it with a pointing device for opening the file represented by the target building, for example, and, when another processing such as selecting a record of the file is required than the default processing to open the file, indicates the required processing to the system by performing a certain manipulation.

As described in connection with the above example, a frame for presenting information has been provided in conventional information visualizing systems, which enables a user to selectively obtain information of a desired item related to a visual object selected among visual objects displayed one after another, by performing a walk-around manipulation, that is, by changing his virtual viewpoint or magnifying/demagnifying the virtual space in the frame, or by performing rearrangement of the visual objects.

Further, there have been also developed many techniques, in the conventional information visualizing system, for presenting related information of the item represented by the visual object, such as bibliographical information or a book list of the same author, for example, when the target item is a book. Among the techniques, a method of displaying related information of an item in an additional window by directly pointing to the visual object of the item or a method of displaying the same by pointing a command icon or selecting a menu command is widely used.

However, the conventional information visualizing system can be said to remain at a stage to provide a frame for presenting information because of following two problems.

The first problem is that the user has been forced to perform another manipulation for obtaining the related information than the manipulation to control the virtual space for searching the target objects such as the walk-around manipulation. The manipulation for obtaining the related information has different nature from the manipulation for changing the virtual space, and must be performed intentionally by the user every time suspending the manipulation to control the virtual space. Therefore, the user has not been able to obtain related information of different items successively by manipulating the virtual space, or to perform the walk-around manipulation referring to related information which is revised one by one.

The second problem is that the situation of the virtual space does not reflected an estimation of dialog context between the system and the user.

Here, the dialog context means global to local information concerning processes of dialog performed or to be performed between the system and the user, which includes information concerning user's intention, manipulation kinds and manipulation sequences from the past to the future. "Searching for a book" is an example of global information concerning a manipulation kind, and "operating a mouse for selecting a command button to execute the search" is an example of local information concerning the manipulation kind. And, the estimation of the dialog context means, for example, to estimate information which the user is requiring presently or to estimate a manipulation of the user to be performed next, according to a manipulation sequence performed by the user. The dialog context has an intimate relation with the situation of the virtual space at the time, which is displayed as the results of the dialog context. For example, when a specific book is displayed with a large size in an information visualizing system for presenting book information making use of a virtual library, the user can be considered to be interested in detail information of the book. On the other hand, from a situation of the virtual space where a general view of several bookshelves is displayed in the virtual library, it can be estimated that the user is narrowing down target genres from genres corresponding to the bookshelves displayed at the time.

Returning to the second problem, the related information is better to be generated in sufficient consideration of the dialog context between the system and the user. However, the situation of the virtual space is not reflected to the dialog context in the conventional information visualizing system. Therefore, only direct and superficial information of the dialog context, such as simple designation of the target object, or in other words, but the dialog context for obtaining the related-information, performed explicitly by the user by suspending manipulation to the virtual space, has not been considered for generating the related information, resulting in a stiff presentation of the related information.

SUMMARY OF THE INVENTION

Therefore, a primary object of the present invention is to provide an information visualizing system for presenting information of items to a user flexibly and automatically according to user's manipulation to control a virtual space, by resolving the above problems of the conventional information visualizing system.

For resolving the first problem, an information visualizing system of the invention, for presenting information of items to a user by appropriately arranging visual objects of the items in a virtual space which is represented with a spatial image virtually generated by a computer, comprises:

a target object indication means for generating a target indication object to be positioned according to operation of the user in the virtual space, calculating a positional relation between the target indication object and each of the visual objects, and designating every of visual objects, whereof the positional relation satisfies a certain condition, as one of target objects when there is any;

a relation designating means for generating a relational condition to be assigned to the target indication object according to operation of the user to designate relation between information of the items represented by the target objects and related-information to be presented to the user;

a related-information generating means for generating related-information according to the relational condition by performing necessary processings onto information concerning items represented by the target objects;

a related-information visualizing means for presenting the related-information to the user by visualizing the related-information in connection with the target objects;

a target object revising means for controlling the target object indication means to update the target objects automatically at appropriate intervals by calculating the positional relation of each of the visual objects every time according to the situation of the virtual space at the time, when the target indication object exists in the virtual space once generated by the target object indication means; and a related-information revising means for controlling the related-information generating means to update the related-information automatically at appropriate intervals every time according to the situation of the virtual space at the time, when the relational condition is once generated by the relation designating means.

Therefore, the target objects and the related-information concerning the target object are always updated automatically even when the situation of the visual space is changed by a walk-around manipulation of the user or a rearrangement of the visual objects, needing no explicit manipulation of the user, once the target indication object and the relational condition are set by the user. Hence, the user can manipulate the virtual space always referring to the related-information presented according to transition of the virtual space, without performing any heterogeneous manipulation.

For resolving the second problem, the related information generating means of the invention comprises:

a basic related-information generating means for generating basic related-information according to the relational condition by extracting information, including the situation of the virtual space at the time, concerning items represented by the target objects; and a related-information processing means for processing the basic related-information into the related-information according to dialog context estimated from the situation of the virtual space.

Therefore, the user can designate the related-information of the desired items also concerning to the situation of the virtual space, and furthermore, the user can obtain the related-information always processed to better conform to the dialog context. Hence, efficiency of user's information acquisition can be considerably improved.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings:

FIG. 4A illustrates a case where relative position of the target indication object 44 of FIG. 3A to the visual objects is so maintained that the indicated object is not changed when the virtual viewpoint is changed;

FIG. 4B illustrates another case where relative position of the target indication object 44 to the screen is so maintained that the target indication object 44 always follows the user's eye;

FIG. 6 illustrates still another example wherein two target indication objects 55 and 56 are displayed each assigned with each respective relational condition;

FIG. 9 is a table chart illustrating an information list 70 listing an example of information used in the information visualizing system of FIG. 1;

FIG. 10 shows flows of data processed by the target indicating means 22 of FIG. 1;

FIG. 12 is a block diagram illustrating the related-information processing means 24 of FIG. 1; and FIG. 13 is a schematic diagram illustrating an example of processing of the related information performed by the related-information processing means 24 of FIG. 12.

DETAILED DESCRIPTION OF THE PREFERRED EMBODIMENTS

Now, embodiments of the present invention will be described in connection with the drawings.

Figure 1:
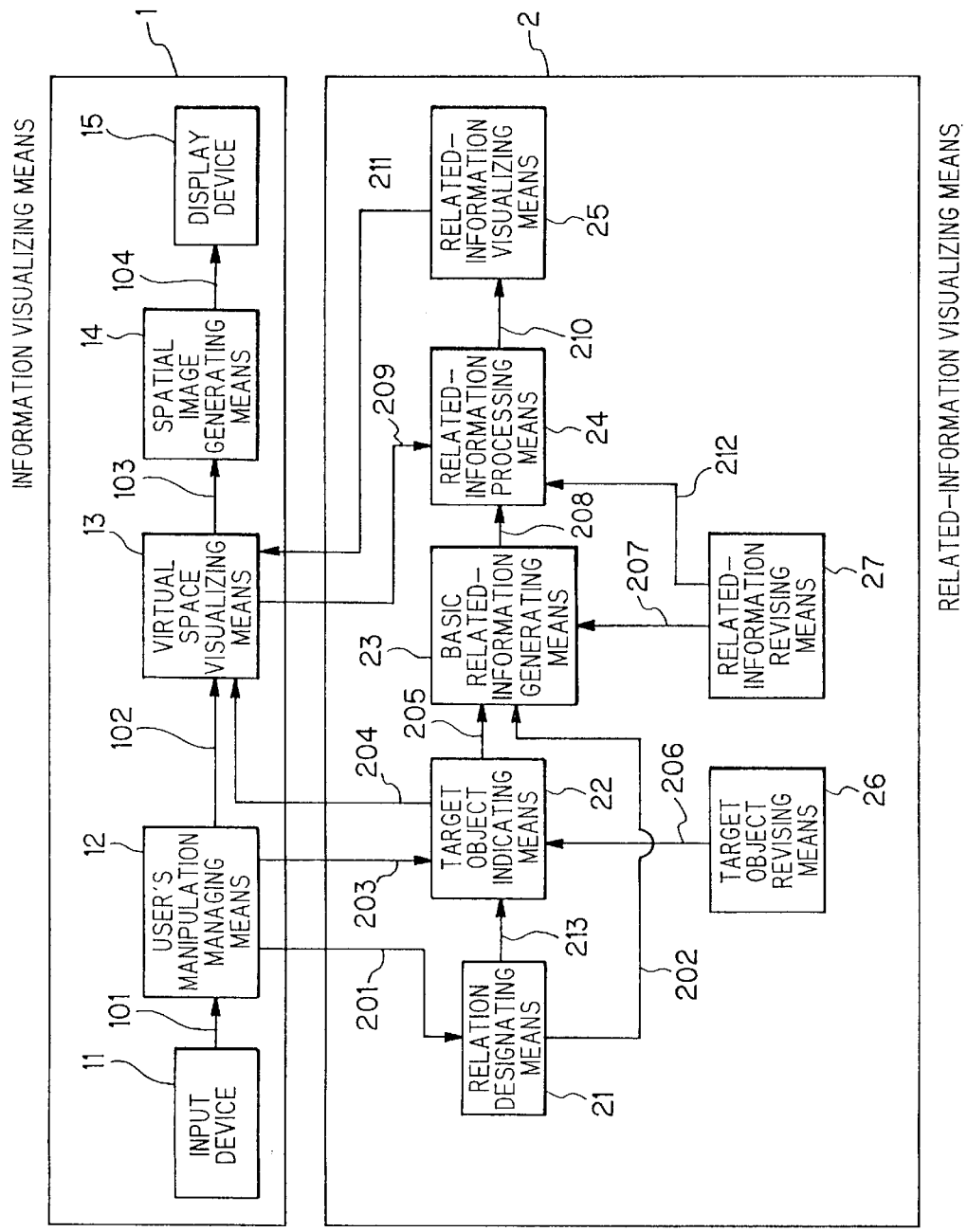
FIG. 1 is a block diagram illustrating an information visualizing system according to the invention

FIG. 1 is a block diagram illustrating an information visualizing system according to the invention, which has an information visualizing means 1 for visualizing information of items making use of a virtual space and visual objects of the items arranged in the virtual space in the same way with the conventional information visualizing system, and a related-information visualizing means 2 newly provided for the invention to enable real-time presentation of the related-information in synchronization with user's manipulation for controlling the virtual space.

The information visualizing means 1 comprises;

an input device 11 whereby a user manipulates the information visualizing system, a user's manipulation managing means 12 for generating a space revising request 102, such as a request to shift a virtual viewpoint in the virtual space, according to contents of user's manipulation 101 supplied through the input device 11 and a dialog process, namely, a transition of the user's manipulation 101, a virtual space visualizing means 13 for generating virtual space data 103, wherewith situation of the virtual space is revised for presenting new information, according to the space revising request 102, a spatial image generating means 14 for; generating a spatial image 104 according to the virtual space data 103, and a display device 15 for displaying the spatial image 104 to the user.

The related-information visualizing means 2 comprises;

a relation designating means 21 for generating a relational condition 202 (such as data defining an attribute to be retrieved from a database for the presentation) together with a relational condition display command 213 for labeling the relational condition 202 onto a target indication object (which will be described afterwards), according to a relation designation command 201 supplied from the user's manipulation managing means 12.

a target object indicating means 22 for generating a target indication object display command 204 to display the target indication object in the virtual space according to a target indication command 203 supplied from the user's manipulation managing means 12, and generating a target list 205 wherein target objects are listed, the target objects being visual objects which have certain positional relation to the target indication object, a basic related-information generating means 23 for generating basic related-information 208 according to the relational condition 202 and the target object list 205, by referring to a database, for example, a related-information processing means 24 for processing the basic related-information 208 into secondary related-information 210 according to situation data 209 of the virtual space supplied from the virtual space visualizing means 13, so as to conform to dialog context between the user and the information visualizing system, a related-information visualizing means 25 for generating a related-information display request 211 according to the secondary related-information 210, a target object revising means 26 for generating a target object re-vision command 206 which controls the target object indicating means 22 to revise the target object list 205, periodically and automatically when neither relation designation command 201 nor target indication command 203 of the user is supplied from the user's manipulation managing means 12, and a related-information revising means 27 for generating a basic related-information revision command 207 and a secondary related-information revision command 212 which control the basic related-information generating means 23 and the related-information processing means 24, respectively, to revise the secondary related-information 210, periodically and automatically when neither relation designation command 201 nor target indication command 203 of the user is supplied from the user's manipulation managing means 12.

Here, in this specification, the related-information of a visual object is defined to include every available information concerning data of the item represented by the visual object, such as information concerning attributes of the data, hierarchical classifications where the data is classified, or relations between the data and the user, or information obtained by sorting the above information in a desired way. Further, a visualized status of the data may be included in the related-information, in an information visualizing system making use of a virtual space.

In the following paragraphs, more details of the related-information will be described in connection with a case where titles and texts of books are visualized by arranging visual objects of the books according to genre in a virtual library created with a computer, by way of example.

FIG. 9 is a table chart illustrating an information list 70 used in an information visualizing system according to the example.

The information list 70 comprises lists of book information, book management information, bookshelf information, virtual space situation information, target indication object management information and user management information.

The book information is the information to be visualized, which is usually stored in a database and consists of data sets each including a book ID (identifier) for identifying a book, a title, an author, published year, a publisher, a genre, and so on, of the book.

The book management information is used by the virtual space visualizing means 13 and consists of data sets each including a book ID for specifying corresponding book information, an object ID for specifying a visual object whereby the book information is represented, a bookshelf ID for specifying a bookshelf where the visual object is arranged, coordinates of the visual object in the virtual space, and so on.

The bookshelf management information consists of data sets each including a bookshelf ID for identifying a specific bookshelf to be displayed as an auxiliary object used for visualizing the book information, coordinates of the bookshelf and so on, and is managed by the virtual space visualizing means 13.

The virtual space situation information, which includes coordinates of the viewpoint, eye direction, pointing information, and so on, is managed by the user's manipulation managing means 12 and the virtual space visualizing means 13 and represents a present situation of the virtual space which changes according to the dialog context.

The target indication object management information is managed by the target object indicating means 22 for revising the target object list 205, and consists of data sets each including a target indication object ID for specifying a target indication object, a relational condition 202 assigned to the target indication object, positional conditions to be applied for discriminating the target objects, coordinates of the target indication object, and so on.

And, the user management information is managed by the user's manipulation managing means 12 and consists of data sets each including a user ID for identifying a specific user of the information visualizing system, access history of the user to the information visualizing system, and so on.

Among data listed in the above information list 70, every data which can be retrieved with a specific book ID and every retrieved data including the book ID is defined as the related-information of the book specified by the book ID.

For example, bibliographical data of the book, such as the author or the published year, are lower attributes belonging to the book, and the genre of the book, such as engineering or literature, is all upper classification including the book, both being defined as the related-information of the book.

Further, positional information of a visual object such as information in which bookshelf the visual object is stored, a display color of the visual object, and positional relation of the visual object to other visual objects are all a part of the related-information of the book, which represents visualized status of the book information and can be retrieved from the book management information with the book ID Further, in the related-information concerning relation between the book information and the user, there is included a list of users who have accessed the book information, an access frequency of a user to the book information, or information of other books which is accessed by a user before or after the book information is accessed with the same user.

Still further, a combination of information retrieved concerning a book and a situation of the virtual space, such as a number of books in each bookshelf written by authors having names beginning with 'S', is also an example of the related-information.

Now, the target indicating means 22 of FIG. 1 according to the invention will be described referring to FIGS. 2 to 4 and FIG. 10.

FIG. 10 shows flows of data processed by the target indicating means 22.

Indication of the target objects in the virtual space should be so performed that the user can easily grasp the indication at a glance of the display screen. For the purpose, special indicators displayed on the screen, such as a pointer cursor or so called a rubber-band, have been used conventionally for indicating the target objects. However, these indicators are controlled in relation to the display screen, and overlaid on a picture of the virtual space, for example, that is, have not been inside members of the virtual space.

Therefore, it has been difficult to indicate the target objects considering three-dimensional relations of visual objects arranged in a virtual space when the virtual space is three-dimensional, or to maintain continuity of the indication when the situation of the virtual space is changed (according to change of the user's viewpoint, for example).

In order to deal with above problem, the target indication means 22 of the invention presents one or more target indication objects arranged in the virtual space as inside members thereof, for enabling the user to indicate the target objects by controlling forms, sizes, or positions of the target indication objects. With these target indication objects, the user can select the target objects making use of three-dimensional relations of visual objects in a virtual space when the virtual space is three-dimensional, or making use of continuity of the indication, even when the situation of the virtual space is changed.

Referring to FIG. 10, the target indicating means 22 checks whether each of the visual objects and the auxiliary objects (such as bookshelves) satisfies a predetermined discrimination condition 311 or not, by substituting variables of a discrimination function, for example, representing the discrimination condition 311 with coordinate values of a target indication object included in the target indication object management information 310, and coordinate values of the concerning visual object included in the book management information 302, or the concerning auxiliary visual object included in the bookshelf management information 303. Then, the target indicating means 22 outputs a set of IDs of visual objects and the auxiliary objects which satisfy the discrimination condition 311 as the target object list 205 of FIG. 1.

The above procedure for discriminating the target objects and outputting the target object list 205 is performed by the target indicating means 22 according to the target object revision command 206 supplied from the target object revising means 26, repeatedly after a target indication object is once generated until the target indication object is explicitly deleted by the user. Therefore, the target object list 205 is always updated automatically even when the situation of the visual space is changed by a walk-around manipulation of the user or a rearrangement of the visual objects. This is an important inventive characteristic of the embodiment, enabling an automatic revision of the target objects according to transition of the visual objects in the virtual space in relation to the target indication object, needing no explicit manipulation of the user once the target indication object is set by the user.

As to the timing to revise the target object list 205, the target object revision command 206 may be generated at every fixed interval referring to a system clock, or it may be generated at every time when the situation of the virtual space is changed by detecting the user's manipulation 101 for revising the situation. Further, the target object revision command 206 may be generated according to loop times (at every time or at every several times) of event-loops performed in the spatial image generating means 14 when it is programmed to have ani event-loop-structure such as applied to an ordinary image generator.

In the following paragraphs, some examples of the target indication object are described referring to FIG. 2, FIGS. 3A to 3F and FIGS. 4A and 4B. Here, a right-left direction, an up-down direction and a normal direction of a screen are defined as X, Y and Z direction, respectively, for convenience of description.

Figure 2:
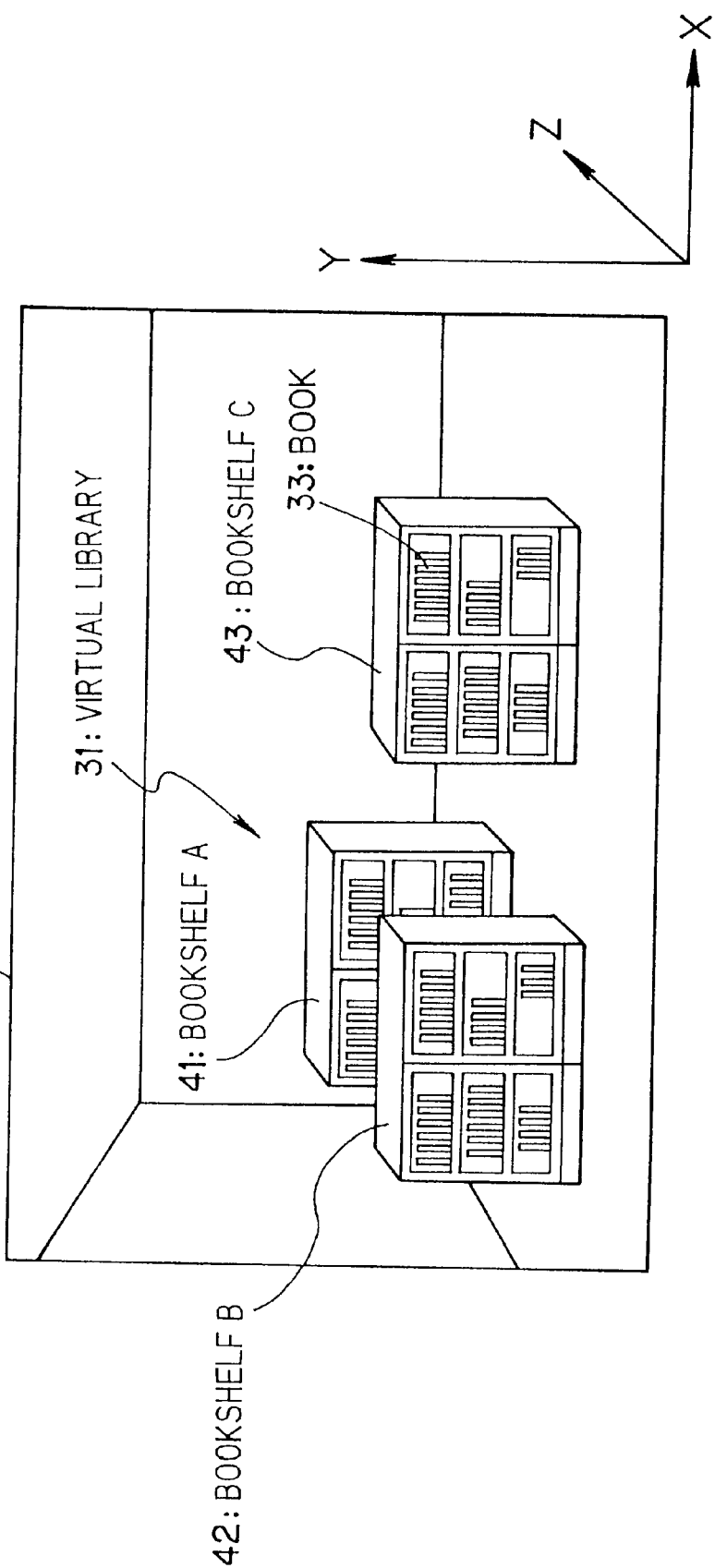
FIG. 2 is a schematic diagram illustrating an example of a spatial image 3 displayed on a display device 15 of FIG. 1.

FIG. 2 is a schematic diagram illustrating an example of a spatial image 3 displayed on a display device 15 of the information visualizing system of FIG. 1, wherein information about books are visualized with visual objects of the books arranged according to genre, in the same way with the conventional information visualizing system.

The spatial image 3 comprises images of a virtual library 31 generated by a computer as a virtual space, visual objects of books 33 whereby information of the books is visualized, and bookshelves 41 to 43 generated as auxiliary objects for storing the books 33. The spatial image 3 represents a part of the virtual space, and the user can search desired information from anywhere in the virtual space by changing his viewpoint or rearranging the visual objects, performing the walk-around manipulation, for example, in order to display the visual objects one after another.

FIGS. 3A to 3F show examples of the target indication object according to the invention, each generated in the virtual space of FIG. 2.

Figure 3A:
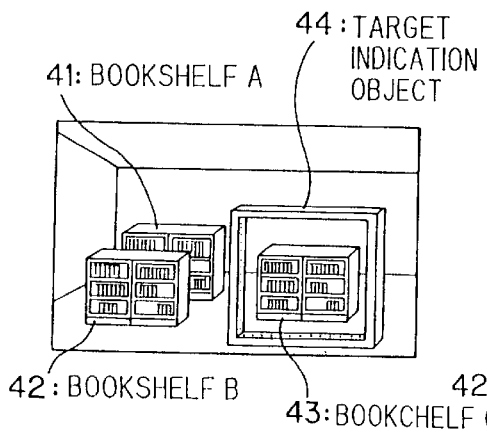
FIG. 3A shows an example of the target indication object according to the invention.

In FIG. 3A, a target indication object 44 having a frame-form is displayed, wherein visual objects positioned inside the frame, that is, visual objects having X-Y coordinates inside X-Y coordinate range of the target indication object 44 may be discriminated as the target objects. In the example of FIG. 3A, visual objects of books in the bookshelf C (43) situated in the frame are defined to be the target objects, and those in the bookshelves A and B (41 and 42) outside the frame are not.

Figure 3B:
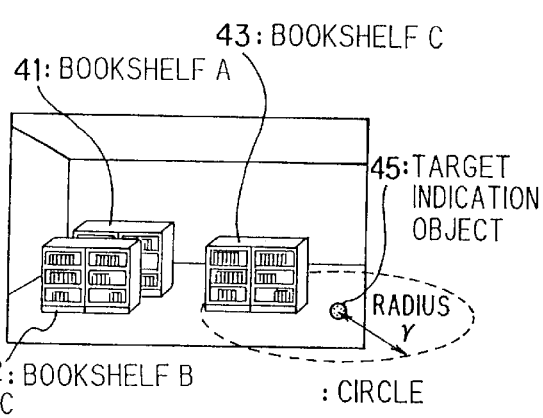
FIG. 3B shows another example of the target indication object according to the invention.

In FIG. 3B, a target indication object 45 having a sphere-form is displayed, wherein visual objects positioned near the sphere, that is, visual objects having X-Z coordinates within a distance r from X-Z coordinates of the target indication object 45 may be discriminated as the target objects. In the example of FIG. 3B, visual objects of books in the bookshelf C (43) situated in a circle 46 having a radius r are defined to be the target objects, and those in the bookshelves A and B (41 and 42) outside of the circle 46 are not. The circle 46 may be displayed in the virtual space or may not be displayed.

A virtual lamp may be used as a target indication object.

Figure 3C:
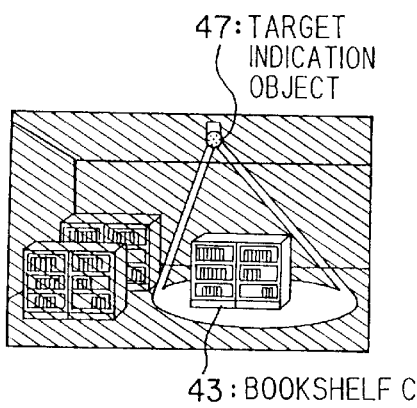
FIG. 3C shows another example of the target indication object according to the invention.

In FIG. 3C, a target indication object 47 represents a spotlight illuminating a part of the virtual space, wherein visual objects illuminated by the target indication object 47, that is, displayed with different brightness or colors from other visual objects, may be discriminated as the target objects. In the example of FIG. 3C, visual objects of books in the bookshelf C (43) illuminated by the spotlight are defined to be the target objects.

Figure 3D:
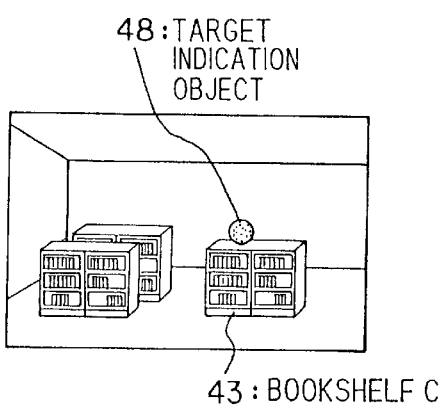
FIG. 3D shows another example of the target indication object according to the invention.

In FIG. 3D, a target indication object 48 having a sphere-form is displayed in the same way in FIG. 3B. However, in this example, the discrimination of the target objects is performed according to whether the sphere is touching or not the auxiliary object whereto visual objects belong. In the example of FIG. 3B, visual objects of books in the bookshelf C (43) touched by the target indication object 48 are defined to be the target objects, and those in the bookshelves A and B (41 and 42) are not.

Figure 3E:
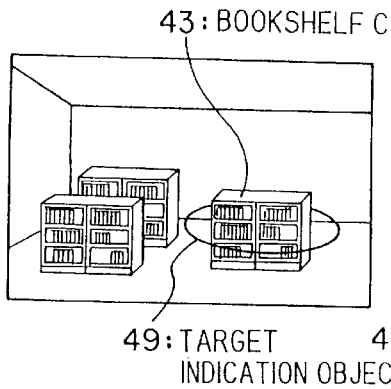
FIG. 3E shows another example of the target indication object according to the invention.

In FIG. 3E, a target indication object 49 having a ring-form is displayed, wherein visual objects enclosed by the ring may be discriminated as the target objects. In the example of FIG. 3E, visual objects of books in the bookshelf C (43) enclosed by the target indication object 49 are defined to be the target objects.

In the above examples of FIGS. 3A to 3E, visual objects belonging to one bookshelf are determined to be the target objects. However, the number of auxiliary objects whereto the target objects belong may be more than one, as illustrated in FIG. 3F.

Figure 3F:
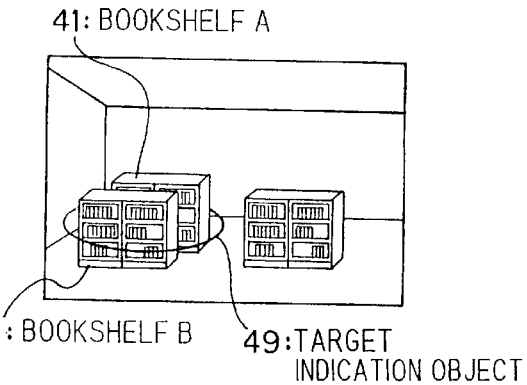
FIG. 3F shows still another example of the target indication object according to the invention.

Further, the target objects may be discriminated directly according to their positional relations to the target indication object, as illustrated in FIGS. 3A to 3C, or they may be discriminated according to positional relations of auxiliary objects whereto the visual objects belong, such as in examples of FIGS. 3D to 3F. In effect, the target objects may be discriminated through the auxiliary objects in the examples of FIGS. 3A to 3C, and they may be discriminated directly in the examples of FIGS. 3D to 3F.

However, the method for indicating the target objects making use of the auxiliary objects has merits that the user can indicate the target objects with a comparatively simple operation, and that the user can indicate the target objects even when they are not actually displayed in the display screen, such as when desired visual objects are positioned just outside of the screen or behind other objects. For example, it is difficult to indicate books stored in the bookshelf A (41) behind the bookshelf B (42), when only the books enclosed by the target indication object 49 are to be discriminated as the target objects, while they can be easily discriminated by indicating the bookshelf A (41).

Now, movement of the target indication object when the user performs a walk-around manipulation is described referring to FIGS. 4A and 4B, wherein the target indication object 44 of FIG. 3A is displayed.

FIG. 4A illustrates a case where relative position of the target indication object 44 to the visual objects is so maintained that the indicated object (the bookshelf C, here) is not changed when the virtual viewpoint is changed. This case is convenient when the user performs the walk-around manipulation being interested in a specific visual object (in order to approach the interesting object, for example).

On the other hand, FIG. 4B illustrates another case where relative position of the target indication object 44 to the screen is so maintained that the target indication object 44 always follows the user's eye, indicating different visual objects one after another. This case is convenient when the user performs the walk-around operation for reviewing the related-information not specifying interesting objects (in order to search the interesting object, for example).

These cases are examples and any appropriate movement may be applied according to user's designation or designer's preparation.

Next, the relation designation means 21 according to the invention will be described referring to FIG. 1, FIGS. 5A, 5B and FIG. 6.

A first function of the relation designation means 21 is to assign a relational condition 202 to a target indication object according to the relation designation command 201 of the user supplied through the user's manipulation managing means 12. When a specific target indication object T is assigned with a relational condition "Whether the author is J. Smith or not", it means that the target objects (books, here) indicated by the target indication object T are to be sorted with the relational condition (Author=J. Smith).

The relational condition, such as (Author=J. Smith) or (Accessed Frequency), may be assigned to a target indication object every time when the relational condition is input through a keyboard or selected from a menu, or a plurality of target indication objects may be before-hand prepared to be selected according to user's option, each assigned with each of relational conditions possible to be applied. In the latter case, the target indication objects may preferably be represented with icons arranged in a menu bar to be selected by the user for designating a desired relational condition.

When a relational condition 202 is assigned to a target indication object, the assigned relational condition 202 is supplied to the basic related-information generating means 23 which takes charge of preparing the basic related-information 208 by actually performing necessary data retrieval, for example. Further, the assigned relational condition 202 is also notified to the target indicating means 22 as the relational condition display command 213 for displaying the assigned relational condition 202 in the virtual space to be presented to the user.

When the relational condition display command 213 is received by the target indicating means 22, necessary information for displaying the relational condition 202 is also included in the target object display command 204 which is supplied to the virtual space visualizing means 13 when the target indication command 203 from the user is supplied.

Figure 5B:
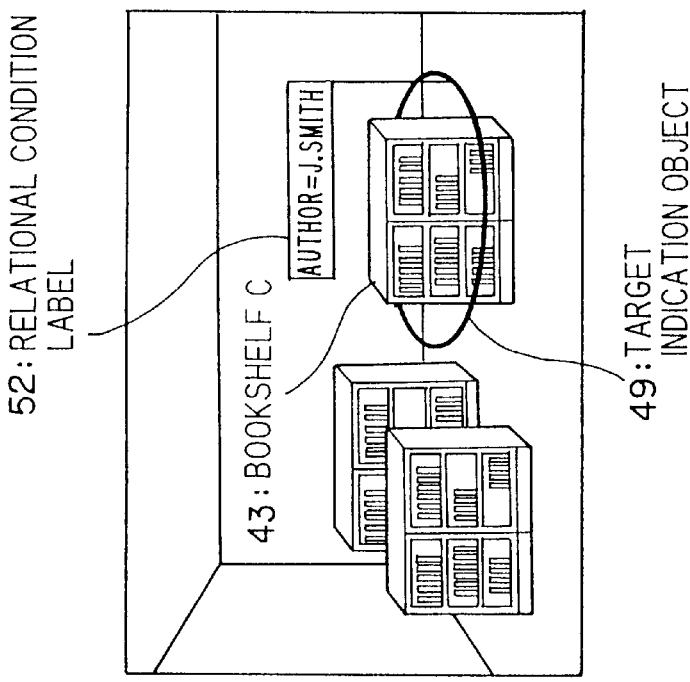
FIG. 5B illustrates another example wherein a similar label 52 is attached to the target indication object 49 of FIG. 3E.
Figure 5A:
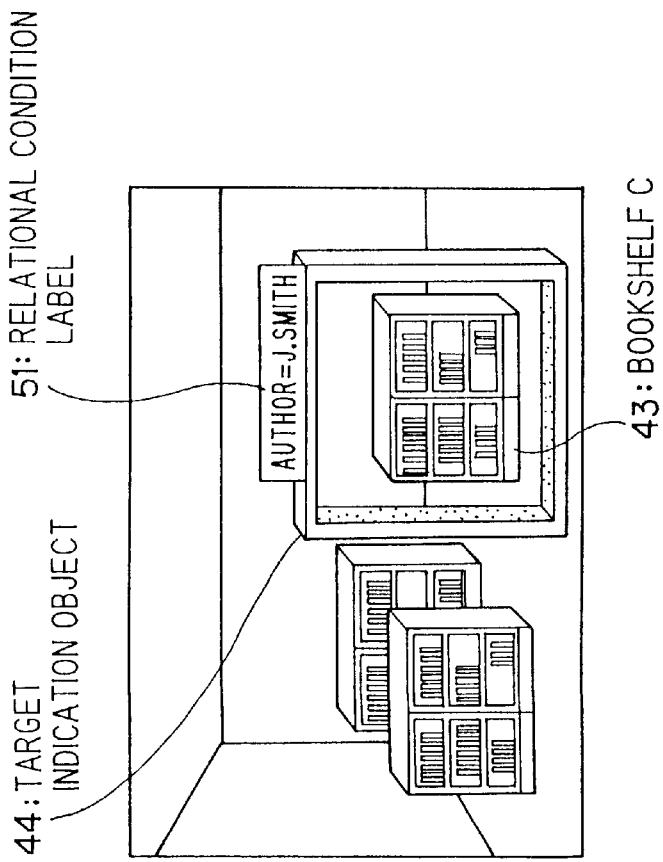
FIG. 5A illustrates ani example wherein a relational condition "Whether the author is J. Smith or not" is assigned and a relational condition label 51 presenting (Author=J. Smith) is attached to the target indication object 44 of FIG. 3A.

FIG. 5A illustrates an example wherein a relational condition "Whether the author is J. Smith or not" is assigned and a relational condition label 51 presenting (Author=J. Smith) is attached to the target indication object 44 of FIG. 3A. With the label 51, the user can easily recognize that a search with the relational condition "Whether the author is J. Smith or not" is to be done for the books stored in the bookshelf C (43) indicated by the target indication object 44. FIG. 5B illustrates another example wherein a similar label 52 is attached to the target indication object 49 of FIG. 3E.

FIG. 6 illustrates still another example wherein two target indication objects 55 and 56 are displayed each assigned with each respective relational condition. In the example, another searching condition "Whether the accessed frequency is more than five or not" is assigned to the first target indication object 55 as its relational condition, and the relational condition "Whether the author is J. Smith or not" is assigned to the second target indication object 56, each represented by each of respective labels 53 and 54. With the labels 53 and 54, the user can easily recognize that a search with the relational condition "Whether the accessed frequency is more than five or not" is to be done for the books stored in the bookshelf A and B (57 and 58) indicated by the first target indication object 55 and another search with the relational condition "Whether the author is J. Smith or not" is to be done for the books stored in the bookshelf B and C (58 and 59) indicated by the second target indication object 56.

Next, the basic related-information generating means 23 according to the invention will be described.

Figure 11:
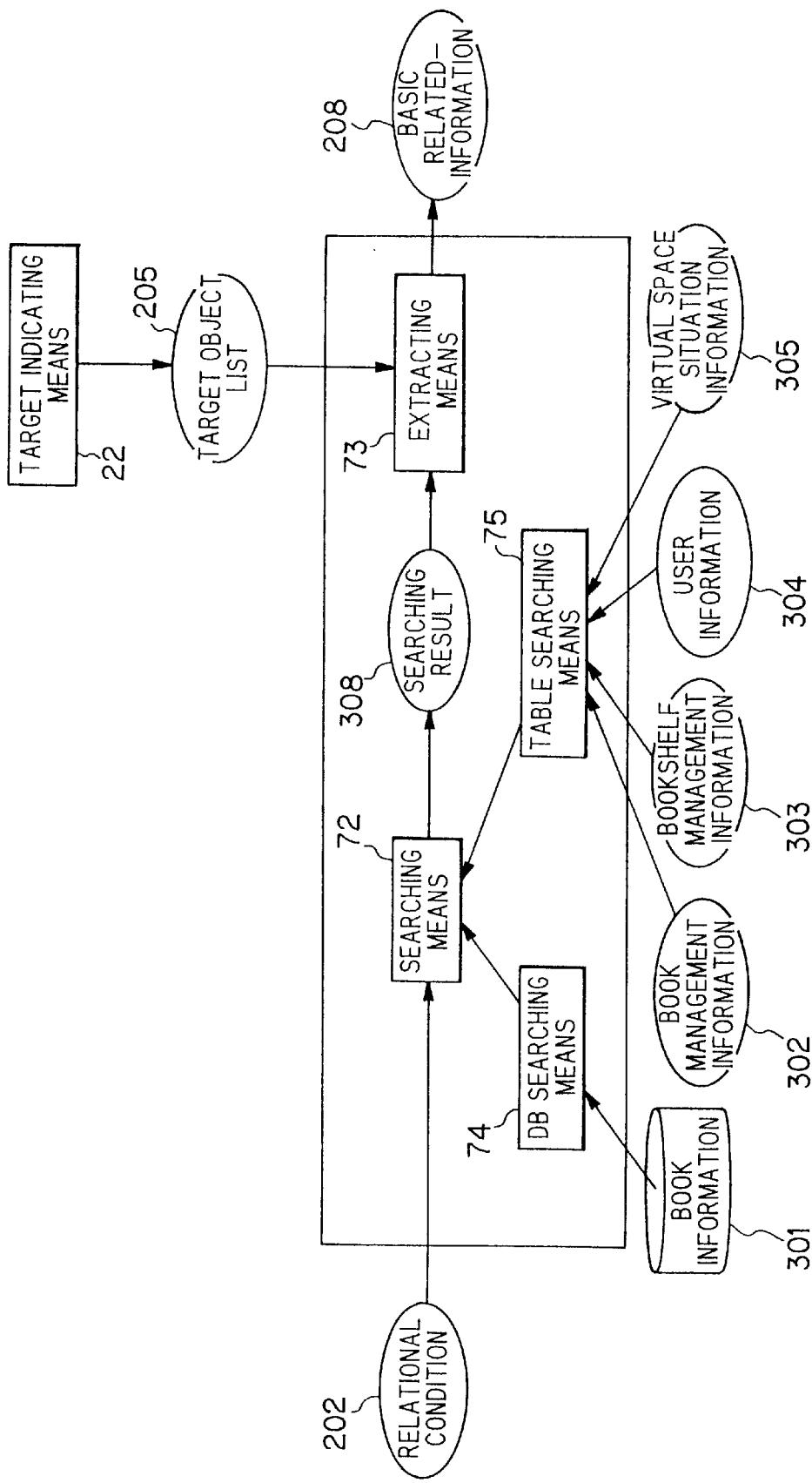
FIG. 11 is a block diagram illustrating a configuration example of the basic related-information generating means 23 of FIG. 1.

FIG. 11 is a block diagram illustrating a configuration example of the basic related-information generating means 23.

In the example, the book information 301 in the information list 70 of FIG. 9 is assumed to be prepared in an external database, and other information, that is, the book management information 302, the bookshelf management information 303, the user management information 304, the virtual space situation information 305 and the target indication object management information 310 is assumed to be prepared in an internal table memory.

Referring to FIG. 11, the basic related-information generating means 23 comprises;
  a searching means 72 for generating searching formulas to be used for searching the external database and the internal table memory for the related-information defined by the relational condition 202,
  a DB searching means 74 taking charge of searching the external database storing the book information 301,
  a table searching means 75 taking charge of searching the internal table memory according to request of the searching means 72, and
  a extracting means 73 for extracting the basic related-information 208 concerning target objects listed in the target object list 205 generated by the target indicating means 22 from searching results 308 which is retrieved by the DB searching means 74 and the table searching means 75 and supplied through the searching means 72.

The searching means 72 generates searching formulas to be used by the DB searching means 74 and the table searching means 75 for retrieving necessary information designated with the relational condition 202. The DB searching means 74 searches the external database by executing query command, for example, according to a searching formula supplied from the searching means 72. The table searching means 75 obtain information stored in entries conforming to a searching formula supplied from the searching means 72, from table data arranged in the internal table memory, by executing sequential search of the table, for example. Then, the retrieved information is integrated by the searching means 72 to be output as the searching results 308, that is, a set of tuples each comprising a book ID and at least one attribute of the book retrieved by the DB searching means 74 and the table searching means 75.

Then, the extracting means 73 extracts the basic related-information 208 concerning target objects listed in the target object list 205, by performing selection operation onto the set of tuples.

As heretofore described, the basic related-information generating means 23 of FIG. 1 according to the invention generates the related-information referring also to information concerning actual situation of the virtual space including coordinate values of each visual object in the virtual space, those of the virtual viewpoint or the relation between the virtual viewpoint and each visual object, in addition to original information of an item represented by a visual object itself. This is another inventive characteristic of the embodiment.

With this characteristic, the basic related-information generating means 23 of FIG. 11 can generate related-information reflecting the situation of the virtual space, such as "The author of the book stored upper left of the bookshelf", only by indicating a bookshelf in the virtual space.

On the other side, the basic related-information generating means 23 of the invention should revise the related-information when the situation of the virtual space is changed, according to a user's manipulation, for example, since the related-information relates also to the situation of the virtual space, the status of the target indication object and so on, in addition to the original information.

For this purpose, the related-information revising means 27 is provided in the embodiment of FIG. 1, which generates a basic related-information revision command 207 every time when the situation of the virtual space is possible to be changed for controlling the basic related-information generating means 23 to update the basic related-information 208.

As to the timing to update the basic related-information 208, the basic related-information revision command 207 may be generated at every fixed interval referring to the system clock, or it may be generated at every time when a user's manipulation 101 for changing the situation of the virtual space or the status of the target indication object is detected. Further, the basic related-information revision command 207 may be generated according to loop times (at every time or at every several times) of event-loops performed in the spatial image generating means 14 when it is programmed to have an event-loop-structure such as applied to an ordinary image generator.

Figure 7B:
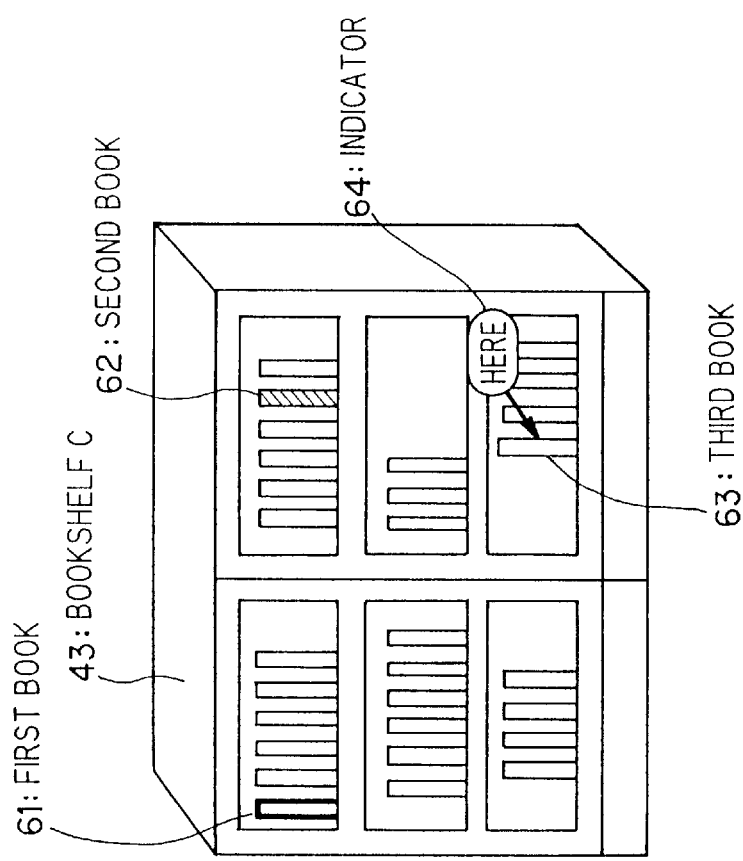
FIG. 7B is a magnified chart of the bookshelf C (43) of FIG. 7A.
Figure 7A:
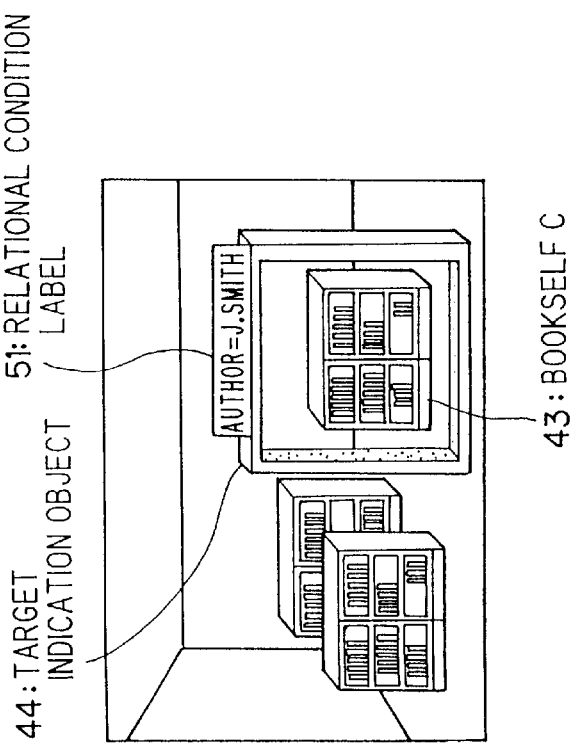
FIG. 7A illustrate an example wherein a relational condition "Whether the author is J. Smith or not" is applied to books stored in the bookshelf C (43) of FIG. 5A.

Next, the related-information visualizing means 25 will be described referring to FIGS. 7A and 7B, which illustrate an example wherein a relational condition "Whether the author is J. Smith or not" is applied to target objects, that is, books stored in the bookshelf C (43) of FIG. 5A. In FIG. 7B, the bookshelf C (43) of FIG. 7A is magnified. In the example of FIG. 7B, books 61, 62 and 63 are assumed to satisfy the above relational condition.

Conventionally, the related-information is displayed in another space, another window, for example, than the virtual space.

The related-information visualizing means 25 of the invention visualizes the related-information directly connected with respective visual objects in the virtual space, enabling the user to obtain the related-information without shifting his eye from interesting objects even when manipulating the virtual space, for example.

The related-information may be visualized by emphasizing outlines of the concerning visual object such as the first book 61, by changing color thereof such as the second book 62, or by attaching an indicator 64 such as the third book 63.

Now, the related-information processing means 24 is described in connection with FIGS. 8A and 8B, FIG. 12 and FIG. 13.

Referring to a block diagram of FIG. 12, the related-information processing means 24 comprises a dialog context estimating means 76 for generating estimated dialog context 317 according to the virtual space situation information 305, and a processing means 77 for processing the basic related-information 208 generated by the basic related-information generating means 23 into the secondary related information 210 which better conforms to the estimated dialog context 317.

As previously described, the situation of the virtual space has an intimate relation with the dialog context between the user and the information visualizing system. For example, from contents of a set of target objects, user's interest can be estimated.

Further, according to positional relations between the set of target objects and the virtual viewpoint, namely, positions and sizes of the target objects, it can be estimated what the user is intending, or in which process of the dialog context the user is, at the timing. Still further, when the dialog context, and actual process in the dialog context is estimated, more adequate presentation of the related-information can be realized by processing the basic related-information 208 generated by the basic related-information generating means 23, into the secondary related-information 210 according to the estimated dialog context 317.

Figure 8B:
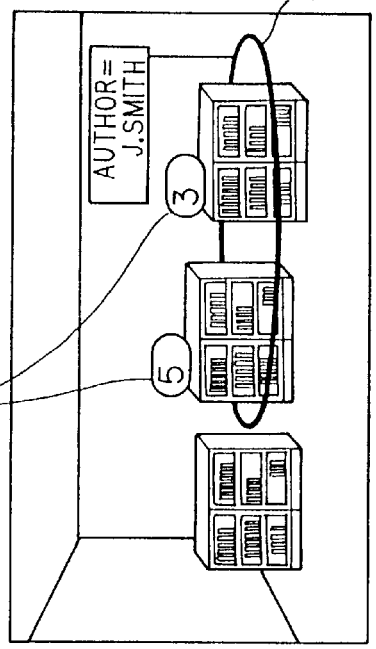
FIG. 8B illustrates another example of the visualized related-information.
Figure 8A:
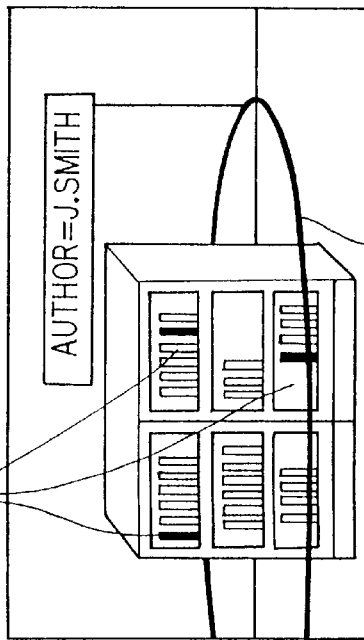
FIG. 8A illustrates an example of visualized related-information.

FIGS. 8A and 8B illustrate examples of processings performed in the related-information processing means 24.

Here, the relational condition "Whether the author is J. Smith or not" is assumed to be assigned to the target indication object, by way of example, and the basic related-information 208 consisting of a set tuples each indicating whether the author of respective book is J. Smith or not, is generated as illustrated in FIG. 13.

When target objects (indicated books) are displayed in the display screen with a large size as illustrated in FIG. 8A, the user is estimated to be interested in detail information of the target objects, that is, to be interested in where of the bookshelf the book of J. Smith are stored. On the other hand, when more than one auxiliary objects (bookshelves) are indicated by the target indication object, the user is estimated in a process of narrowing down the target objects actually displayed, and interested in how many books of J. Smith exist in each bookshelf.

According to the above estimated dialog context 317, the processing means 77 outputs the basic related-information 208 as it is without performing any processing, to be displayed as visualized basic related-information 67, in the example of FIG. 8A. On the other hand, the basic related-information 208 consisting of the set of tuples is processed by the processing means 77 into the secondary related-information 210 consisting of another set of tuples each indicating a number of J. Smith's books in respective bookshelf, referring to the book management information 302 as shown in FIG. 13, and displayed as visualized secondary related-information 65, in the example of FIG. 8B.

Here also, the related-information processing means 24 should update the secondary related-information because the estimated dialog context 317 should change when the situation of the virtual space is changed.

For this purpose, the related-information revising means 27 of FIG. 1 also generates a secondary related-information revision command 212 together with the basic related-information revision command 207 every time when the situation of the virtual space is possible to be changed for controlling the related-information processing means 24 to update the secondary related-information 210.

As to the timing to update the secondary related-information 210, the secondary related-information revision command 212 may be generated at every fixed interval referring to the system clock, or it may be generated at every time when a user's manipulation 101 for changing the situation of the virtual space or the status of the target indication object is detected. Further, the secondary related-information revision command 212 may be generated according to loop times (at every time or at every several times) of event-loops performed in the spatial image generating means 14 when it is programmed to have an event-loop-structure such as applied to an ordinary image generator, in the same way with the basic related-information revision command 207.

As heretofore described, once the user has set a relational condition together with a target indication object, the user can obtain the related-information presented automatically and appropriately according to the actual situation of the virtual space without performing any explicit manipulation for requesting the related-information, in the information visualizing system of the invention.

Further, the related-information is always so processed according to the actual situation of the virtual space as to well conform to the dialog context, in the information visualizing system of the invention.

Therefore, the information visualizing system of the invention enables the user to manipulate the virtual space always referring to the related-information appropriately presented to conform to the user's intention, considerably improving efficiency of user's information acquisition.

What is claimed is:

1. An information visualizing system for presenting information about items to a user by appropriately arranging visual objects of the items in a virtual space which is represented with a spatial image virtually generated by a computer, said information visualizing system comprising:

a relation designating means for generating a relational condition according to operation of the user to designate a relation between information about the item and related-information to be presented to the user:

a related-information generating means for generating related-information according to the relational condition by processing information concerning items represented by target objects selected among the visual objects, said related-information generating means comprising basic related-information generating means for generating basic related-information according to the relational condition by extracting information, including the situation of the virtual space at the time, concerning items represented by the target objects, and related-information processing means for processing the basic related-information into the related-information according to a dialog context estimated from the situation of the virtual space;

a related-information visualizing means for presenting the related-information to the user by visualizing the related-information in connection with the target objects; and a related-information revising means for controlling the related-information generating means to update the related-information automatically at appropriate intervals according to a situation of the virtual space at the time, when the relational condition is once generated by the relation designating means.

2. An information visualizing system for presenting information about items to a user by appropriately arranging visual objects of the items in a virtual space which is represented with a spatial image virtually generated by a computer, said information visualizing system comprising:

a target object indicating means for generating a target indication object to be positioned according to operation of the user in the virtual space, calculating a positional relation between the target indication object and each of the visual objects, and designating every of visual objects, whereof the positional relation satisfies a certain condition, as one of target objects when there is any;

a relation designating means for generating a relational condition to be assigned to the target indication object according to operation of the user to designate relation between information of the items represented by the target objects and related-information to be presented to the user;

a basic related-information generating means for generating basic related-information according to the relational condition by extracting information, including a situation of the virtual space, concerning items represented by the target objects;

a related-information processing means for processing the basic related-information into the related-information according to dialog context estimated from the situation of the virtual space;

a related-information visualizing means for presenting the related-information to the user by visualizing the related-information in connection with the target objects;

a target object revising means for controlling the target object indicating means to update the target objects automatically at appropriate intervals by calculating the positional relation of each of the visual objects every time according to the situation of the virtual space at the time, when the target indication object exists in the virtual space once generated by the target object indicating means; and a related-in-formation revising means for controlling the basic related-information generating means and the related-information processing means to update the related-information automatically at appropriate intervals every time according to the situation of the virtual space at the time, when the relational condition is once generated by the relation designating means.

3. An information visualizing system as recited in claim 2; wherein said target object revising means controls the target object indicating means to update the target objects periodically even when there is no manipulation of the user for directly controlling the target indication object.

4. An information visualizing system as recited in claim 2; wherein said target object revising means controls the target object indicating means to update the target objects every time when the situation of the virtual space is changed by detecting a user's manipulation for controlling the situation of the virtual space.

5. An information visualizing system as recited in claim 2; wherein said related-information revising means controls the basic related-information generating means and the related-information processing means to update the related-information periodically even when there is no manipulation of the user for directly controlling any of the target indication object and the relational condition.

6. An information visualizing system as recited in claim 2; wherein said related-information revising means controls the basic related-information generating means and the related-information processing means to update the related-information every time when the situation of the virtual space is changed by detecting a user's manipulation for controlling the situation of the virtual space.

* * * * *